Jan. 5, 1937.  M. R. WOLFARD  2,066,923
MANIFOLD SYSTEM FOR MULTICYLINDER INTERNAL COMBUSTION ENGINES
Filed March 7, 1935  4 Sheets-Sheet 1
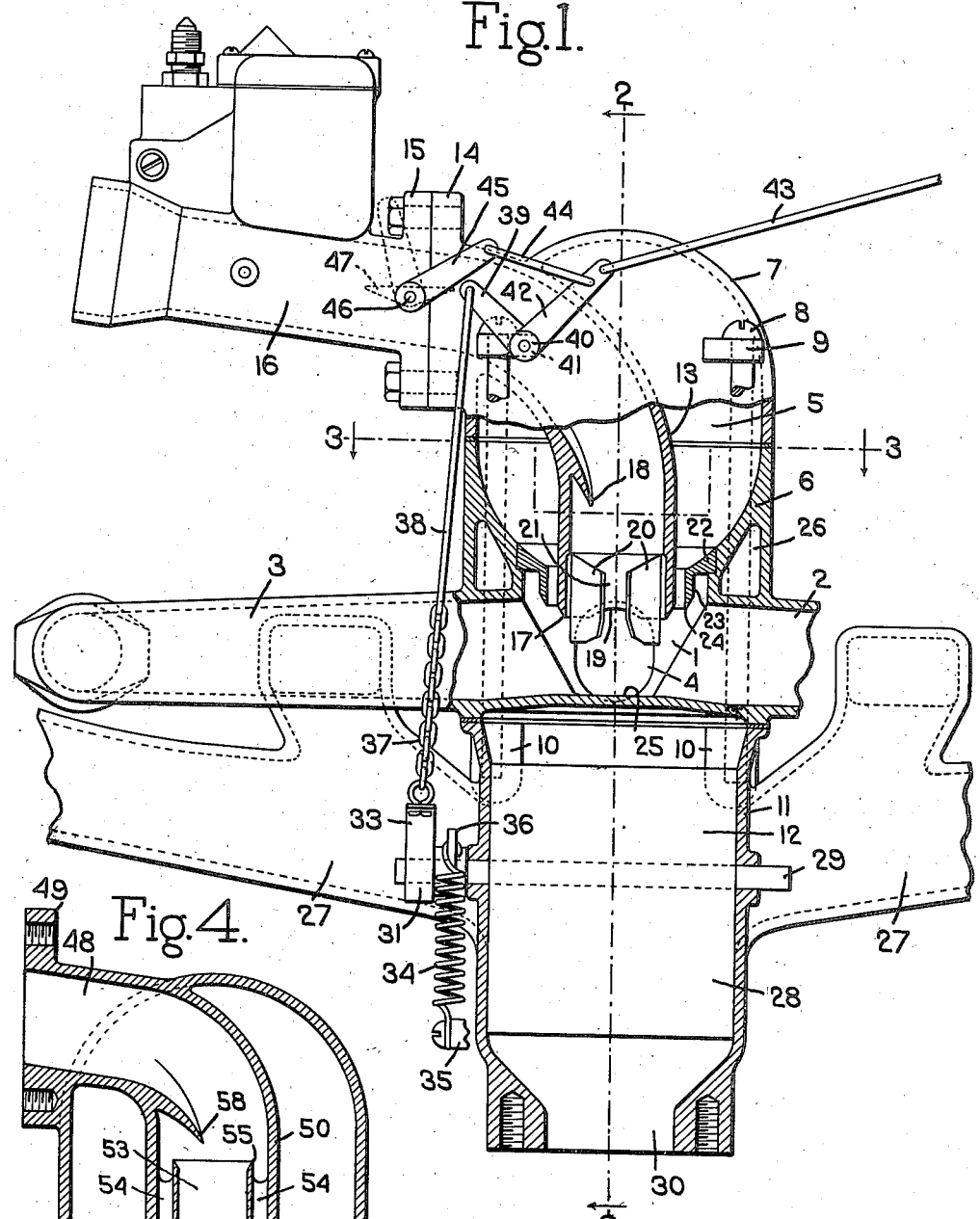
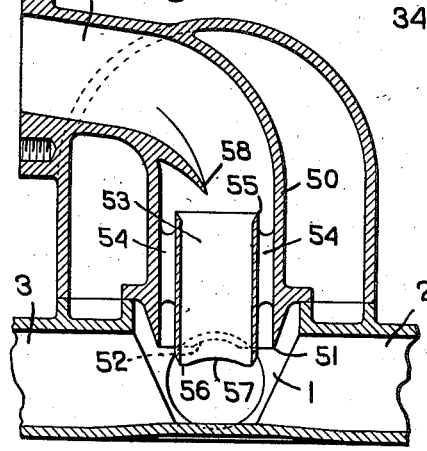
Inventor.
Merl R. Wolfard
by Heard Smith & Tennant
Attys.

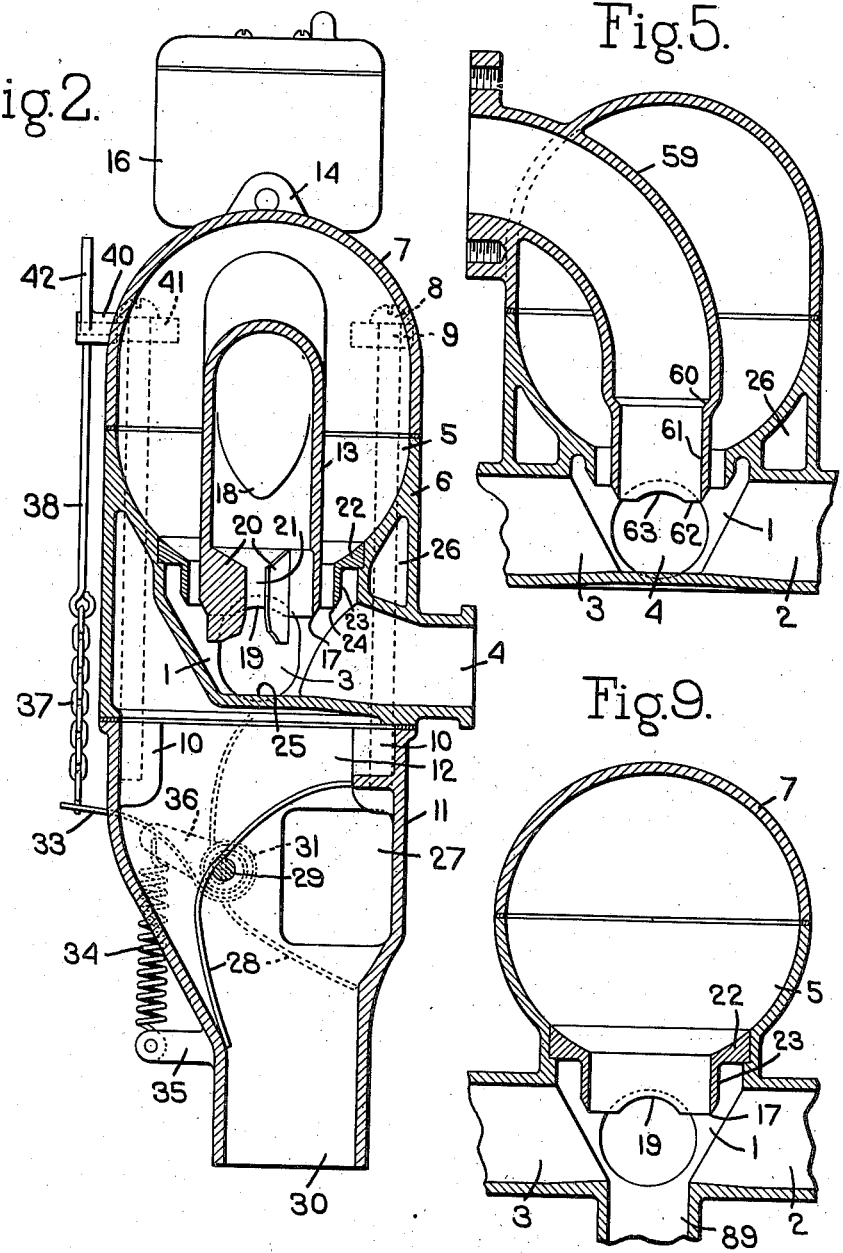

Jan. 5, 1937.     M. R. WOLFARD     2,066,923
MANIFOLD SYSTEM FOR MULTICYLINDER INTERNAL COMBUSTION ENGINES
Filed March 7, 1935     4 Sheets-Sheet 3
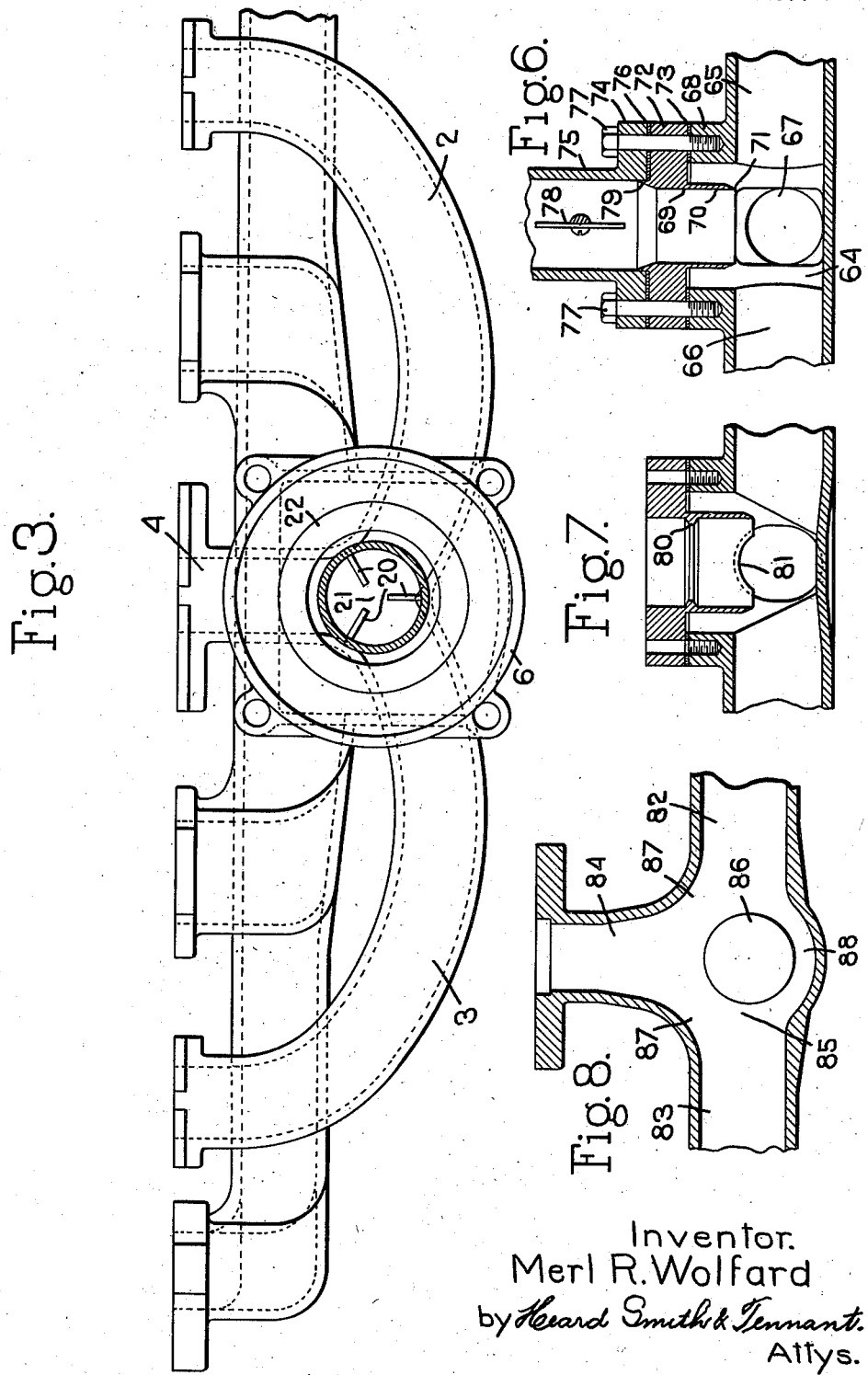
Inventor.
Merl R. Wolfard
by Heard Smith & Tennant.
Attys.

Inventor.
Merl R. Wolfard
by Heard Smith & Tennant.
Attys.

Patented Jan. 5, 1937

2,066,923

UNITED STATES PATENT OFFICE 2,066,923

MANIFOLD SYSTEM FOR MULTICYLINDER INTERNAL COMBUSTION ENGINES

Merl R. Wolfard, Cambridge, Mass., assignor to Hopewell Brothers, Watertown, Mass., a copartnership composed of Charles F. Hopewell and Helen C. Hopewell Application March 7, 1935, Serial No. 9,788

27 Claims. (Cl. 123—122)

This invention relates to improvements in manifold systems for multi-cylinder internal combustion engines, and the general object of the invention is to provide means for delivering a properly proportioned fuel-air mixture from any suitable mixing device, such as a carbureter, to all the cylinders of the engine in such manner that each cylinder will receive the same ratio of fuel to air as is supplied by the mixing device, at whatever speed, torque, or temperature the engine is operating, to provide optimum volumetric and thermal efficiency at full load operations of the engine and maximum economy during light and medium load operations of the engine.

It has long been recognized and proven by repeated tests that in manifolds for multi-cylinder internal combustion engines, particularly in the conventional type used on six-cylinder engines, the mixture delivered to the respective cylinders varies greatly (as much as 15% or more) under some operating conditions.

The difficulty of obtaining uniform quality in the mixture as delivered to the several cylinders of a multi-cylinder internal combustion engine is due primarily to changes in velocity of the mixture passing into and through the several branches or conduits of the manifold.

During acceleration of the fuel-air mixture the liquid particles entrained therein tend to lag behind the lighter gaseous portion of the stream. This is due to the fact that the greater energy necessary to accelerate the relatively much denser and heavier liquid particles must be obtained from the direct impact of the gases upon the liquid particles in combination with the friction of the gaseous stream upon the liquid particles. Therefore, the velocity of the air stream must be substantially greater in order to accelerate the liquid particles at all and when the rate of acceleration is high the lag of the liquid particles is much greater.

It follows from this that whenever the direction of travel of the fuel-air mixture is changed there is a tendency for the liquid particles to follow the shortest path possible and the more circuitous paths in the passages or conduits are filled with the more gaseous or lighter mixture.

A further consideration is that in the passages through which the liquid particles are carried in an air stream during acceleration, the friction against the walls of the passages tends to retard the relative acceleration of the gases in proximity thereto, hence the middle portion of the air stream, accelerating faster, tends to leave behind during acceleration of the mixture larger and larger proportions of liquid particles which tend to drift toward the walls of the passage.

In manifolds for multi-cylinder internal combustion engines, as heretofore constructed, the distributing section into which the fuel-air mixture is introduced is substantially a continuation of the inlet passage leading from the carbureter and branches extend at approximately right angles therefrom to the cylinders of the engine. In such constructions the liquid particles flowing along and near the walls of the inlet passage enter the distributing section along its walls.

I am aware that offsets or shoulders have been provided in the passages leading from the distributing section of the manifold to the cylinders of the engine for the avowed purpose of deflecting the liquid fuel particles into the air stream and also that sharp angles have been used at elbow turns for the same purpose. Such measures, though somewhat effective, are remedial in nature, but inadequate to produce the desired result of supplying a mixture having the same fuel to air ratio to the respective cylinders of the engine.

An object of the present invention is to provide means for supplying a properly proportioned fuel-air mixture to the distributing section of the inlet manifold of a multi-cylinder internal combustion engine in such manner as to cause greater concentration of the fuel particles within the mixture in the middle portion of said distributing section than in the surrounding portion contiguous to the peripheral wall thereof and to the entrances of the several conduits leading to the respective cylinders of the engine, in order that during the induction stroke of the engine, when the fuel-air mixture is drawn with accelerating velocity into the entrance to a conduit a larger proportion of the liquid fuel particles in the mixture will be drawn into the middle portion of said conduit than when the greater concentration of the liquid particles is in the peripheral portion of the distributing section, (such as obtains in usual manifold constructions).

A further object of the invention is to provide directing means so constructed and so positioned relatively to the incoming and outgoing currents of fuel-air mixture as to cause liquid fuel particles in the mixture to be carried directly into the middle portion of a conduit in greater concentration than would otherwise obtain, particularly during that portion of an induction stroke of the engine when the quantity of the mixture entering said conduit is increasing.

A further object of the invention is to introduce the fuel-air mixture into the distributing section through separate passageways, of the same or different areas, discharging their contents at different positions and/or different levels and/or different angles in such manner that the coordinated result is more effective carrying forward of the liquid fuel particles into the body stream of the fuel-air mixture as it enters a conduit.

A further object of the invention is to provide directing means within the distributing section spaced apart from the peripheral wall thereof having such horizontal extent relative to that of the distributing section as to form a channel, between said means and the wall of the distributing section intermediate of the conduits, through which lateral movement of the fuel-air mixture during each induction stroke of the engine will sweep liquid fuel particles from the walls of said channel.

Another object of the invention is to provide means for introducing a properly proportioned fuel-air mixture into the distributing section comprising a delivery tube extending downwardly and discharging the fuel-air mixture into the distributing section in such manner as to prevent the flow of liquid particles directly from the delivery tube to the wall of the distributing section during idle and light load operations of the engine.

When a fuel-air mixture carrying entrained liquid fuel particles is decelerated, the reverse action occurs as compared with acceleration; that is, the greater inertia of liquid fuel particles carries them forward while the lighter gaseous portion of the mixture lags behind. This further complicates the problem of equal fuel-air ratio distribution to the several cylinders.

My observations indicate that this action is most disturbing at the distributing section of the manifold and follows back-surging of the fuel-air mixture, as it occurs successively in the respective conduits of the manifold immediately following the induction stroke of the piston in the cylinder to which a conduit leads. The disturbing influence of this back surging increases in proportion to the length of the conduit leading from the distributing section to the inlet port of a cylinder of the engine, and further increases with the increase in speed, and also increases with the increase in density of the fuel-air mixture, which in throttle-governed engines increases with torque.

In a high speed engine during the induction stroke of the piston in any one of the cylinders which is connected to a long conduit leading from the distributing section of the manifold, the velocity of the fuel-air mixture in the conduit increases to a maximum near the middle portion of the travel of the piston, decreases thereafter, and is stopped suddenly by the closing of the inlet valve, thus causing a very substantial compression in the gaseous column near the inlet valve. This compression immediately reacts causing a back flow or surge into the distributing section which causes liquid particles entrained in the air to be projected into an opposite conduit leading to another cylinder, or to be deposited against an opposite wall of the distributing section of the manifold.

The influence of this back surge at the distributing section is one of the main causes of the alteration in the fuel-air ratio as delivered to the different cylinders of the engine, particularly in three-branch manifolds, such as are used on six-cylinder engines, in which the long conduits are in substantial alinement and the short third conduit is approximately at right angles thereto.

The disturbing influence of these back surges is augmented in six-cylinder engines where the usual firing order is: 1, 5, 3, 6, 2, 4. This augmented disturbance is most pronounced and occurs once in each long branch during a complete cycle in the six cylinders because this back surging occurs twice in each long conduit to project liquid fuel into the opposite long conduit before forward flow of the mixture in said opposite long conduit occurs.

An object of the invention is to provide an improved construction in which conduits of different lengths extending from the periphery of the distributing section to the cylinders of the engine are equally spaced in said periphery or otherwise have their positions of entrance and their angles of entrance to said distributing section so correlated relatively to each other and to the contour of said distributing section as to cause a back surge from any one of the longer conduits to throw liquid particles entrained in the air stream in substantially equal proportions toward the entrance to other conduits.

In my prior patent, No. 1,956,606 granted May 1, 1934, I pointed out the advantages of using a surge absorbing or energy-dissipating chamber located above the distributing section of the manifold to minimize the intensity of surges.

An object of the present invention is to provide an improved construction in which liquid particles flowing down the wall of the energy-dissipating chamber will be discharged downwardly into the body portion of the distributing section and will commingle with the mixture therein while the quantity of the mixture entering a conduit is increasing during the accelerating portion of an induction stroke and will be prevented from flowing directly down along the peripheral wall of the distributing section at any time. Desirably said peripheral wall terminates in a thin wall and has recesses complementary to the respective conduit entrances acting during an induction stroke of the engine, when the quantity of mixture entering a conduit is increasing, to concentrate liquid fuel particles within the mixture, in the central portion of said conduit.

Another object of the invention is to provide means for effectively heating the distributing section of an inlet manifold comprising a heating jacket around said distributing section, an exhaust manifold having branches extending from all the cylinders of the engine directly to a heating chamber located beneath said distributing section and communicating with said jacket, and a regulating valve in said heating chamber selectively operable to deflect all the exhaust gases upwardly over the walls of the distributing section or to deflect said gases directly away from said heating chamber so that they will be discharged without passing over the walls of said distributing section.

A further object of the invention is to provide means connecting the regulating valve to the throttle control of the carbureter operable to move the regulating valve to a position in which it will deflect more of the gases away from the heating chamber as the throttle valve approaches wide open position.

A further object of the invention is to provide thermostatic means intermediate of the regulating valve and the throttle control for positioning the regulating valve during idle and light load operations of the engine.

These and other objects and features of the invention will more fully appear from the following description and the accompanying drawings and will be particularly pointed out in the claims.

Illustrative embodiments of the invention are shown in the accompanying drawings, in which:

Fig. 1 is a view, partially in elevation and partially in vertical section, of a manifold system for multi-cylinder internal combustion engines comprising an inlet manifold having a distributing section with conduits leading to the cylinders of the engine, an energy-dissipating section located above the distributing section, an exhaust manifold with a heating chamber located beneath the floor of the distributing section, a valve in said heating chamber, a carbureter connected to a delivery tube extending downwardly to the distributing section of the inlet manifold, and means connecting the throttle control of the carbureter to the regulating valve of the heating chamber;

Fig. 2 is a vertical sectional view on line 2—2 Fig. 1;

Fig. 3 is a horizontal sectional view on line 3—3, Fig. 1;

Fig. 4 is a detail view in vertical section showing a modified form of delivery tube construction without an energy-dissipating section;

Fig. 5 is a detail view in vertical section of a modified form of delivery tube construction;

Fig. 6 is a detail view in vertical section of another modified form of delivery tube construction;

Fig. 7 is a detail view in vertical section of another modified form of the discharge end of the delivery tube;

Fig. 8 is a view in horizontal section through the central portion of a three-branch manifold in which the long conduits are in substantial alinement and showing a directing member in the middle portion thereof;

Fig. 9 is a detail view in vertical section of a manifold construction embodying the invention in which the fuel-air mixture is introduced upwardly into the distributing section;

Figure 10:
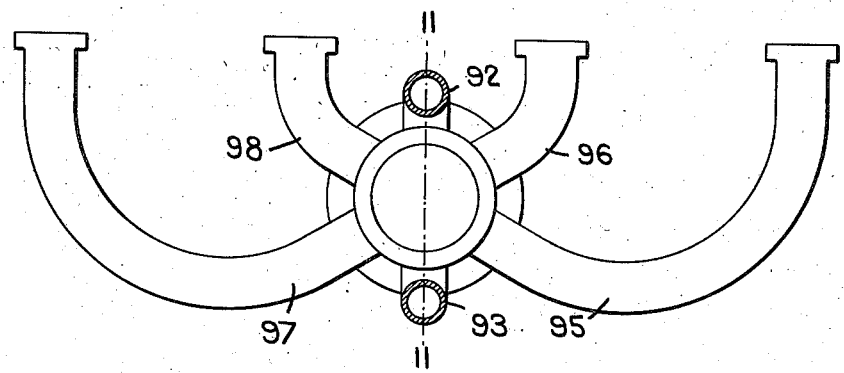
Fig. 10 is a plan view of a construction embodying the invention as applied to the manifold for an eight-cylinder engine.

The manifold system illustrated in Figs. 1, 2, and 3, of the drawings, comprises an inlet manifold having a distributing section 1, with conduits 2, 3, and 4, leading from the periphery thereof to the cylinders of the engine. An enlarged chamber forming an energy-dissipating section 5 is located above the distributing section and the lower portion 6 of the energy-dissipating section is preferably cast integral with the inlet manifold. The upper portion of the energy-dissipating section is preferably in the form of a spheroidal cap 7 mounted upon the lower portion of the energy-dissipating section and is secured thereto by cap screws 8 extending through suitably spaced flanges 9, on the wall of the cap and anchored in bosses 10 extending from the wall 11 of a heating chamber 12 which is located below the floor of the distributing section 1.

A delivery tube 13 in the form of an elbow, which is preferably formed integral with the cap 7, extends outwardly from the cap and is provided with a flange 14 by means of which it is secured to a complementary flange 15 upon the casing of a suitable carbureter 16. The portion of the delivery tube 13 within the energy-dissipating section curves downwardly and is adapted to discharge the fuel-air mixture vertically into the middle portion of the distributing section 1. The delivery tube terminates in a thin peripheral wall 17 adapted to prevent accumulation of any sizable globules of liquid thereon and is spaced apart from the wall of the distributing section so that liquid fuel cannot flow directly from the discharge end of the delivery tube to the wall of the distributing section.

Desirably the lower curved wall of the elbow on which fuel tends to collect is provided with a downwardly extending directing member in the form of a fin 18 presenting a thin edge adapted to prevent the liquid fuel from flowing down the vertical wall to the discharge end of the delivery tube and will throw the liquid fuel into the air stream when there is appreciable velocity through said delivery tube, or will cause liquid fuel during idle and light load operations of the engine to fall directly into the middle portion of the distributing section.

The thin peripheral wall 17 at the lower end of the delivery tube is provided with a recess 19 complementary to the entrance to each conduit and the lower end portion of the delivery tube has longitudinal vanes 20 which extend inwardly from the walls thereof and project below the discharge end of the delivery tube. These vanes are respectively positioned peripherally opposite the portions of the wall of the distributing section intermediate of the conduits. Said vanes do not extend to the center of the delivery tube, but have a space 21 between them which is enlarged as the lower end is approached. The spaces between the vanes 20 form passageways through which the fuel-air mixture is delivered into the middle portion of the distributing section and cause co-acting currents therein which together with the contour of the distributing section produce concentration of the liquid fuel particles carried in the air streams toward the middle portion of the entrance to a conduit during that portion of an induction stroke of the engine when the quantity of mixture entering the conduit is increasing.

The recesses 19 preferably have a contour similar to but of smaller area than the complementary entrances to the conduits and serve to concentrate fuel particles in that portion of the fuel-air stream which enters directly into the central portion of the conduit during the induction stroke of the engine.

One of the objects of the present invention is to provide a construction in which liquid particles flowing down the wall of the energy-dissipating section will be discharged downwardly into the body portion of the distributing section and will commingle with the mixture therein while the quantity of the mixture entering a conduit is increasing during the accelerating portion of an induction stroke, and will be prevented from flowing down along the peripheral wall of the distributing section at any time.

In the construction shown in Fig. 1 the lower portion 6 of the energy-dissipating section has an annular ring 22 set in the lower portion of its wall, the upper surface of the ring being concavedly curved to form a continuation of the spherical wall of the distributing section. The lower portion of the ring comprises a cylindrical wall 23 which is spaced apart from the wall of the distributing section and terminates in a sharp edge 24. The distributing section preferably increases in cross sectional area from the lower portion thereof upwardly, thereby providing the distributing section with a relatively large upper portion into which fuel-air mixture is discharged free from its wall with a small floor area 25 to insure sweeping of the liquid fuel from the floor of the distributing section during each induction stroke of the engine. The entrances to the conduits 2, 3, and 4, are equally spaced in the peripheral wall of the distributing section so that a back surge from any one of the longer conduits will throw liquid particles entrained in the air stream in substantially equal proportions toward the entrances to the shorter conduit.

A heating jacket 26 extends around the lower portion of the energy-dissipating section and around the distributing section and communicates with the heating chamber 12. The exhaust manifold 27 has branches leading from all the cylinders of the engine directly to the heating chamber 12 which is located below the distributing section of the inlet manifold. The heating chamber 12 communicates with the jacket 26, thereby providing effective heating means surrounding the distributing section and the lower portion of the energy-dissipating section. A regulating valve 28 in the heating chamber is suitably secured to a shaft 29 and is selectively operable to deflect all the exhaust gases upwardly over the walls of the distributing section and through the heating jacket, or to deflect said gases in such manner that they will be directly discharged away from the heating chamber without passing over the walls of the distributing section.

The regulating valve 28 is of such curved contour that when in full line position illustrated in Fig. 2 it will deflect the exhaust gases downwardly through the outlet 30 away from the heating chamber, but when in the position illustrated in dotted lines will deflect all the exhaust gases upwardly over the walls of the distributing section and through the heating jacket, thus providing ample heat for raising the temperature quickly when starting a cold engine. After the engine is warmed up this quantity of heat is too great for normal operations, except during exceeding cold weather, and some means are necessary to cut down the quantity of exhaust gases circulated through the heating jacket.

As illustrated in Figs. 1 and 2, a thermostat 31 in the form of a spiral of bi-metallic metal is secured at one end to a shaft 32 and at its other end extends outwardly in the form of an arm 33 to normally position the valve 28. The lower edge of the valve 28 is forced toward engagement with the wall of the heating chamber, as shown in dotted line position in Fig. 2, by a spring 34 which is anchored at one end to a boss 35 projecting from the wall of the heating chamber and at its other end is connected to the end of an arm 36 which is fixedly secured to the shaft 32.

Any suitable means may be provided to position the arm 33 of the thermostat. In the particular construction shown the arm 33 of the thermostat is connected by a flexible member, such as a chain 37 to a link 38 the upper end of which is pivotally connected to the arm 39 of a bell crank lever 40 which is pivotally mounted on a boss 41 projecting from the wall of the cap of the energy-dissipating section. The other arm 42 of the bell crank lever 40 is connected to the throttle control rod 43. The arm 42 of the bell crank lever is connected by a link 44 to an arm 45 which is rigidly secured to the shaft 46 upon which the throttle valve 47 of the carbureter 16 is mounted. The arm 39 of the bell crank lever 40 is shorter than the arm 33 of the thermostat, so that the arm 39 will not move the regulating valve 28 through its full range of movement. Usually this range of movement will be less than one-half the total range of movement of the valve 28, but may be varied to suit specific conditions.

Assuming the thermostat to have moved the valve 28 toward an intermediate position, then as the throttle valve 47 is moved toward wide open position the regulating valve 28 will be moved toward the position illustrated in full lines in Fig. 2. As illustrated in full line position, under normal Summer operating temperatures, the exhaust gases will all be deflected away from the heating chamber when the throttle valve is in wide open position.

A modification of the invention is illustrated in Fig. 4 in which the energy-dissipating section is omitted and the heat jacket is extended around the major portion of the delivery tube. In this construction the delivery tube is in the form of an elbow having a cylindrical inlet portion 48 having a flange 49 adapted to be secured to the complementary flange 16 of the carbureter, with an enlarged lower portion 50 which extends vertically downwardly and into the distributing section and terminates in a thin wall 51 having a recess 52 complementary to the entrance to each conduit. A tubular directing member 53 is supported in the lower end portion of the delivery tube, preferably by webs 54 which are integral with the wall of the delivery tube. The upper end of the wall of the tubular directing member is beveled outwardly to present a sharp edge 55 and the lower end of the tubular member is beveled inwardly to present a sharp edge 56, and the lower edge of the tubular member is provided with a recess 57 complementary to the entrance to each of said conduits.

The lower curved wall of the elbow on which fuel tends to collect is provided with a downwardly extending directing member in the form of a fin 58 extending over the upper end of the tubular member 53 and terminates in a thin edge and serves to throw the liquid fuel into the air stream when there is appreciable velocity through said delivery tube and will cause liquid fuel during idle and light load operations of the engine to fall through the middle portion of the tubular member 53 and into the middle portion of the distributing section.

Another modification of the invention is shown in Fig. 5, in which the distributing section, the energy-dissipating section, the manner of communication therebetween is substantially the same as that shown and described in respect to Figs. 1 and 2. In this construction the wall of the delivery tube 59 near its discharge end is offset inwardly to provide an inclined shoulder 60 leading to a restricted cylindrical discharge portion 61 having a thinner wall and terminating in an edge 62 having a recess 63 complementary to the entrance to each of the conduits. In operation the liquid particles which may flow along the wall of the delivery tube are directed toward the center of the delivery tube by the shoulder 60 and are carried through the discharge end of the delivery tube into the middle portion of the distributing section. By reason of the restricted portion 61 at the discharge end of the delivery tube, the velocity of the fuel-air mixture flowing therethrough is increased and liquid fuel particles carried therein will be carried into the middle portion of the distributing section and drawn directly therefrom into the middle portion of a conduit during that portion of an induction stroke when the quantity of mixture entering said conduit is increasing.

Another modification of the invention is illustrated in Fig. 6, in which the manifold comprises a distributing section 64 with conduits 65, 66, and 67, extending to the respective cylinders or pairs of cylinders of the engine. The manifold is provided with an upwardly extending boss 68 surrounding the upper portion of the distributing section. The delivery tube 69 is of generally cylindrical form having a wall 70 which is spaced apart from the peripheral wall of the distributing section and terminates in a thin wall 71. The delivery tube is provided with a relatively thick flange 72 which is mounted upon the boss 68 with a gasket 73 therebetween, and a flange 74 of a carbureter 75 is superimposed upon the flange 72 with a gasket 76 therebetween. The flanges of the delivery tube and the carbureter are clamped together and upon the boss 68 by suitable cap screws 77.

In this construction the throttle valve 78 of the carbureter is in close proximity to the upper end of the delivery tube. The upper end of the delivery tube desirably presents an offset or shoulder 79 which is inclined downwardly and acts to deflect liquid particles flowing downwardly along the wall of the carbureter 75 toward the central portion of the delivery tube, so that the fuel-air mixture is discharged downwardly into the middle portion of the distributing section 64. The cross sectional area of the delivery tube is preferably approximately equal to the net flow area at the throttle valve in the carbureter when in wide open position, as illustrated.

The construction illustrated in Fig. 7 differs from that shown in Fig. 6 in that the distributing section increases in cross sectional area from the lower portion thereof upwardly and in that the delivery tube is provided near its discharge end with an inwardly projecting rib 80 having a downwardly and inwardly inclined upper wall, and a downwardly and outwardly inclined lower wall, said rib acting to deflect liquid particles flowing downwardly along the wall of the carbureter and delivery tube toward the central portion of the delivery tube. The peripheral wall of the lower end portion of the delivery tube has a recess 81 complementary to the entrance to each of the conduits.

Fig. 8 is a horizontal sectional view through the central portion of a tree-branch manifold of the usual type in which the long branches 82 and 83 are in substantial alinement and the short branch 84 extends from the distributing section 85 at right angles to the axial direction of the longer conduits 82 and 83. In this construction a directing member 86 is positioned eccentrically in the distributing section 85 and spaced apart from the walls thereof. The directing member 86 desirably is of general conoidal form and extends upwardly from the floor of the distributing section and terminates substantially at a point near the discharge end of the delivery tube through which the fuel-air mixture is discharged downwardly into the distributing section. The eccentric position of the directing member in the distributing section is such that the passageway 87 between the wall of the directing member and the wall of the distributing section establishing communication directly between the long conduit and a short conduit is of greater cross sectional area than the passageway 88 between the wall of said directing member and the wall of the distributing section establishing direct communication between the longer conduits.

The relative sizes of the passageways 87 and 88 are such as to cause a back surge in either of the longer conduits to throw liquid particles entrained in the air in as large proportion toward the entrance to the short conduit as toward the entrance to the opposite long conduit thus producing approximately the same result as when the entrances to the conduits are spaced equiangularly about the periphery of the distributing section.

An embodiment of certain features of the invention is illustrated in Fig. 9 as applied to a manifold in which the fuel-air mixture is introduced upwardly into the distributing section. In this construction the distributing section 1, the conduits 2, 3, and 4, the energy-dissipating section 5 and the ring 22 are of the same general construction as shown in Figs. 1 and 2 of the drawings. The delivery tube 89 extends upwardly and communicates directly with the lower portion of the distributing section. In this construction during an induction stroke of the engine, when the quantity of the mixture entering a conduit is increasing, fuel-air mixture will flow directly from the delivery tube into said conduit, and some fuel-air mixture will also be drawn from the energy-dissipating section into said conduit. When the quantity of the fuel-air mixture entering said conduit is decreasing, then part of the fuel-air mixture will flow directly from the delivery tube into said conduit, and a part thereof will flow upwardly into the energy-dissipating section. The sharp edge 17 will cause the entering mixture to throw liquid particles away from the inner wall of the ring 22 and tend to carry the same into the lower middle portion of the energy-dissipating section and on the next succeeding induction stroke will be drawn downwardly into the central portion of the distributing section and directed by a recess 19 toward the upper middle portion of the entrance to the conduit which communicates with the cylinder in which the induction stroke of the piston is occurring.

Figure 11:
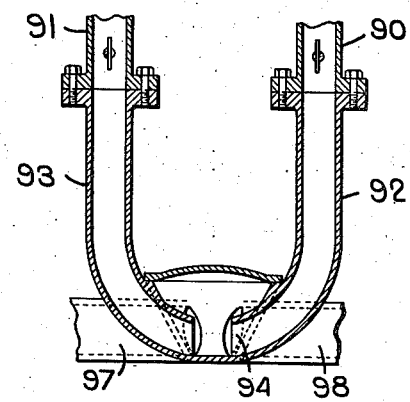
Fig. 11 is a vertical sectional view on line 11—11, Fig. 10, illustrating also a dual carbureter connected to the delivery tubes leading to the distributing section.

Figs. 10 and 11 illustrate the invention as it may be applied to a manifold for an eight-cylinder engine in which the fuel-air mixture is delivered downwardly from two carbureters through separate delivery tubes to the distributing section of a manifold having four conduits extending from the periphery thereof to pairs of cylinders of the engine. In this construction the two carbureters 90 and 91 are connected to and communicate respectively with delivery tubes 92 and 93 which extend downwardly and are curved inwardly at their lower ends and preferably project into the distributing section 94. The fuel-air mixture is discharged in converging streams which tend to concentrate the fuel-air particles carried in the air stream in the central portion of the distributing section, so that they will be carried directly into the middle portion of the entrance to a conduit during an induction stroke of the engine. Pairs of conduits 95, 96, and 97, 98 extend from opposite sides of the periphery of the distributing section intermediate of the delivery tubes 92 and 93. In this construction the relative position of the entrances to the conduits in said intermediate periphery is largely a matter of convenience inasmuch as during an induction stroke in any conduit, while the quantity of mixture entering said conduit is increasing, a stream of fuel-air mixture will flow from each delivery tube into said conduit, and the liquid particles entrained in the air stream will be drawn into the middle portion of the entrance to the conduit. In this construction the distributing section preferably also increases in cross sectional area from the lower portion thereof upwardly and in such case provides a very effective sweeping of the floor area during each induction stroke of the engine.

Figure 12:
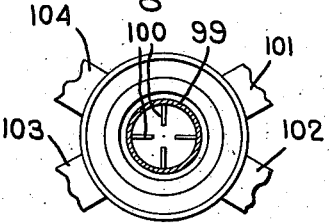
Fig. 12 is a horizontal sectional view showing an arrangement of the discharge end of a delivery tube for a four-branch manifold.

Fig. 12 is a plan view of an embodiment of the invention similar to that already described with reference to Figs. 1 to 3 as it may be applied to an eight-cylinder engine and illustrates a delivery tube 99 having four longitudinal vanes 100, similar to the vanes 20 shown in Fig. 1, which extend inwardly from the walls thereof and project below the discharge end of the delivery tube. These vanes 100 are respectively positioned peripherally opposite the portions of the wall of the distributing section intermediate of the conduits 101, 102, 103, 104, which, as illustrated, have their entrances at the same angular relation as shown in Fig. 10.

It has been pointed out that during the acceleration of the fuel-air mixture the liquid particles entrained therein lag behind the lighter gaseous portion of the stream and therefore whenever the direction of travel of the fuel-air mixture is changed abruptly the liquid particles tend to follow the shortest path possible. The more circuitous paths in the passages or conduits are filled with the more gaseous or lighter portion of the mixture.

In usual manifold constructions the distributing section of the manifold is substantially a continuation of the inlet passage leading from the carbureter thereto and branches or conduits extend at substantially right angles thereto to the respective cylinders of the engine. It therefore follows that the liquid particles entrained in the fuel-air mixture in following the shortest path from the inlet passage to a branch or conduit of the manifold during acceleration of the mixture will tend to drift toward the junction of the wall of the inlet passage and said conduit.

The present invention comprises a construction which minimizes or prevents this drift, or in other words concentrates the liquid fuel particles entrained in the air stream in the middle portion of the entrance to a conduit, particularly during that portion of the induction stroke of the engine when the quantity of the mixture entering the conduit is increasing as contrasted with the distribution of liquid fuel particles in the entrance to a conduit in manifolds as heretofore constructed. This concentration is accomplished by introducing the fuel-air mixture into the middle portion of the distributing section in such manner as to concentrate the liquid fuel particles in said middle portion, so that they will be carried forward into the middle portion of a conduit during an induction stroke of the engine. This is supplemented by positively directing a portion of said mixture to a position beyond the level of the center of the conduit, whereby the liquid fuel particles in said portion will be carried directly into that part of the entrance to a conduit which is remote from the junction which in usual manifolds produces the concentrating drift above referred to.

In the simpler constructions shown in Figs. 5, 6, and 7, the delivery tube is restricted near its discharge end to increase the velocity of the fuel-air mixture as it enters the distributing section of the manifold, and the discharge end of the delivery tube is in the form of a thin peripheral wall spaced apart from the peripheral wall of the distributing section to insure the carrying of liquid particles into the central portion of the distributing section and thence to the central portion of a conduit during an induction stroke of the engine when the quantity of mixture entering said conduit is increasing.

In the construction shown in Figs. 1, 2, 3, 4, 10, 11, and 12, a plurality of passageways are provided which direct the fuel-air mixture in co-acting currents into the distributing section of the manifold in such manner that portions of the mixture are carried directly to different parts of the body portion of the distributing section, apart from its wall, from which the liquid fuel particles are carried forward directly into the body portion of the entrance to a conduit during an induction stroke of the engine when the quantity of mixture entering said conduit is increasing, thus insuring continuous carrying forward of the liquid particles entrained in the air without drift or lag of the fuel particles relative to the quantity of air moving forward in the mixture stream such as occurs in usual manifold constructions.

In the particular construction shown in Fig. 4, the greater portion of the liquid particles carried forward in the fuel-air mixture will enter the central tubular directing member when a relatively large proportion of the liquid fuel in the mixture is unvaporized, as occurs during cold starting of the engine, or when operating in extremely cold weather. The more gaseous portion of the mixture flows through the passageways surrounding the tubular directing member and is heated by the exhaust gases circulating in the jacket surrounding the delivery tube, thus providing an envelope of relatively warm and dry mixture around the central core of denser and wetter mixture as it is carried forward into the middle portion of the distributing section.

In the construction as shown in Figs. 1, 2, 3, and 5, where an energy-dissipating section is employed to minimize the intensity of surges in the manifold, an envelope of relatively warm and therefore drier mixture also surrounds the mixture stream discharging from the delivery tube during that part of the induction stroke of the engine when the quantity of mixture enering the conduit is increasing.

The deleterious effects produced by back-surging, as already pointed out, in usual manifold constructions are eliminated in the present invention by spacing the entrances to the conduits in the periphery of the distributing section in approximately equiangular positions, as shown in Fig. 3, so that a back surge from any one of the conduits into the distributing section will throw liquid particles in substantially equal proportions toward the entrance to other conduits; or directing means within the distributing section may be provided, as illustrated and described in reference to Fig. 8, to accomplish the same result.

By reason of the present invention such a degree of perfection is attained in the carrying forward of the fuel-air mixture from any suitable mixing device, such as a carbureter, to all the cylinders of the engine, that each cylinder will receive substantially the same ratio of fuel to air mixture as is supplied by the mixing device at whatever speed, torque, or temperature the engine is operated, and will produce an optimum volumetric and thermal efficiency at full load operations of the engine and maximum economy during medium and light load operations of the engine.

It will be understood that the particular embodiments of the invention shown and described herein are of an illustrative character and not restrictive of the meaning and scope of the following claims.

Having thus described the invention, what is claimed as new, and desired to be secured by Letters Patent, is:

1. A manifold for a multi-cylinder internal combustion engine comprising a distributing section, conduits leading from the periphery of the distributing section to the cylinders of the engine, means for supplying a properly proportioned fuel-air mixture to said distributing section including means for discharging portions of the fuel-air mixture into the distributing section at different levels operable while the quantity of the mixture entering a conduit is increasing during the accelerating portion of an induction stroke, to produce co-acting currents which will cause concentration of liquid fuel particles within the mixture in the middle portion of the entrance to said conduit.

2. A manifold for a multi-cylinder internal combustion engine comprising a distributing section, conduits leading from the periphery of the distributing section to the cylinders of the engine, means for supplying a properly proportioned fuel-air mixture to said distributing section including a plurality of passageways operable to produce co-acting currents of the fuel-air mixture which will concentrate the liquid fuel particles within the mixture in said middle portion of the entrance to a conduit during the induction stroke of the engine.

3. A manifold for a multi-cylinder internal combustion engine comprising a distributing section, conduits leading from the periphery of the distributing section to the cylinders of the engine, means for supplying a properly proportioned fuel-air mixture to said distributing section including a delivery means extending into the distributing section comprising a plurality of passageways co-acting to concentrate liquid fuel particles within the mixture in the middle portion of a conduit during an induction stroke of the engine.

4. A manifold for a multi-cylinder internal combustion engine comprising a distributing section, conduits extending from the periphery of said distributing section to the cylinders of the engine, means for introducing a properly proportioned fuel-air mixture into said distributing section comprising a delivery tube extending downwardly and having a discharge end portion provided with a plurality of passageways terminating at the level of a portion of the entrance to said conduits and co-acting to concentrate liquid fuel particles within the mixture in the middle portion of the distributing section, said distributing section having a space surrounding the discharge end of the delivery tube to prevent the flow of liquid particles directly from the discharge end of the delivery tube downwardly along the peripheral wall of the distributing section.

5. A manifold for a multi-cylinder internal combustion engine comprising a distributing section, conduits extending from the periphery of said distributing section to the cylinders of the engine, means for introducing a properly proportioned fuel-air mixture into said distributing section comprising a delivery tube extending downwardly and discharging said mixture toward the central portion of said distributing section, longitudinal vanes, within said delivery tube near its discharge end, extending below said discharge end and positioned peripherally opposite the portions of the wall of said distributing section, intermediate of said conduits.

6. A manifold for a multi-cylinder internal combustion engine comprising a distributing section, conduits extending from the periphery of said distributing section to the cylinders of the engine, means for introducing a properly proportioned fuel-air mixture into said distributing section comprising a delivery tube extending downwardly and terminating in a thin peripheral wall and having within its discharge end a tubular directing member spaced apart from the wall thereof and terminating in a thin edge at a different level from that of said peripheral wall.

7. A manifold for a multi-cylinder internal combustion engine comprising a distributing section, conduits extending from the periphery of said distributing section to the cylinders of the engine, means for introducing a properly proportioned fuel-air mixture into said distributing section comprising a delivery tube extending downwardly and terminating in a thin peripheral wall and having within its discharge end a tubular directing member spaced apart from the wall thereof and terminating in a thin edge at a different level from that of said peripheral wall, and directing means extending from the wall of said delivery tube acting to conduct liquid fuel flowing along said wall to the central portion of said delivery tube above said tubular directing member.

8. A manifold for a multi-cylinder internal combustion engine comprising a distributing section, conduits extending from the periphery of said distributing section to the cylinders of the engine, said distributing section increasing gradually in cross sectional area upwardly from the level of the floor entrance to said conduits, means for introducing a properly proportioned fuel-air mixture into said distributing section, comprising a delivery tube extending downwardly and having a discharge end portion provided with a plurality of passageways terminating at the level of a portion of the entrances to said conduits, said distributing section having a space surrounding the discharge end of the delivery tube whereby cooperating currents of fuel-air mixture will concentrate liquid fuel particles within the mixture in the middle portion of an entrance to a conduit during an induction stroke of the engine.

9. A manifold for a multi-cylinder internal combustion engine comprising a distributing section, conduits extending from the periphery of said distributing section to the cylinders of the engine, means for supplying a properly proportioned fuel-air mixture to said distributing section including directing means acting on the fuel-air mixture within said distributing section to concentrate liquid fuel particles within the mixture in the middle portion of the entrance to a conduit during that part of an induction stroke of the engine when the quantity of mixture entering said conduit is increasing, said conduits having their positions of entrance and their angles of entrance to said distributing section so correlated relatively to each other and to the contour of the distributing section as to cause a back surge from any one of the conduits to throw liquid particles entrained in the air stream in substantially equal proportions toward the entrance to other conduits.

10. A manifold for a multi-cylinder internal combustion engine comprising a distributing section, conduits extending from the periphery of said distributing section to the cylinders of the engine, means for introducing a properly proportioned fuel-air mixture into said distributing section in such manner as to prevent unequal concentration of fuel particles within the mixture in any localized portion of said distributing section contiguous to the entrance to one of the conduits, said conduits having their positions of entrance and their angles of entrance to said distributing section so correlated relatively to each other and to the contour of said distributing section as to cause a back surge from any one of the conduits to throw liquid particles entrained in the air stream in substantially equal proportions toward the entrance to other conduits, thus insuring substantial equality in the ratio of fuel to air in the charges delivered to the respective cylinders of the engine.

11. A manifold for a multi-cylinder internal combustion engine comprising a distributing section, conduits having different effective surge lengths extending from the periphery of said distributing section to the cylinders of the engine, means for introducing a properly proportioned fuel-air mixture into said distributing section toward the central portion thereof, said conduits having their positions of entrance and their angles of entrance to said distributing section so correlated relatively to each other and to the contour of said distributing section as to cause a back surge from one of said longer conduits to throw liquid particles entrained in the air stream in as large proportion toward the entrance to a shorter conduit as toward the entrance to another longer conduit.

12. A manifold for a multi-cylinder internal combustion engine comprising a distributing section, three conduits approximately equally spaced about the periphery of said distributing section extending therefrom to the cylinders of the engine, means for introducing a properly proportioned fuel-air mixture into said distributing section toward the central portion thereof, said conduits having their angles of entrance to said distributing section so correlated relatively to each other and to the contour of the distributing section as to cause a back surge from one of the conduits to throw liquid particles entrained in the air stream toward the entrance to other conduits in such proportion as to insure substantial equality in the ratio of fuel to air in the charges delivered to the respective cylinders of the engine.

13. A manifold for a multi-cylinder internal combustion engine comprising a distributing section, having its lower portion of smaller horizontal cross sectional area than its upper portion, conduits extending from the periphery of said distributing section to the cylinders of the engine, means for introducing a properly proportioned fuel-air mixture into said distributing section toward the central portion thereof, said conduits having their positions of entrance and their angles of entrance to said distributing section so correlated relatively to each other and to the contour of said distributing section as to cause a back surge from any one of the conduits to throw liquid particles entrained in the air stream in substantially equal proportions toward the entrance to other conduits, thus insuring substantial equality in the ratio of fuel to air in the charges delivered to the respective cylinders of the engine.

14. A manifold for a multi-cylinder internal combustion engine comprising a distributing section, conduits extending from the periphery of said distributing section to the cylinders of the engine, means for introducing a properly proportioned fuel-air mixture into said distributing section toward the central portion thereof, directing means within said distributing section spaced apart from the peripheral wall thereof, having such horizontal extent relative to that of said distributing section as to form a channel between said directing means and the wall of the distributing section intermediate of said conduits, whereby lateral movement of the fuel-air mixture during each induction stroke of the engine will sweep liquid fuel particles from the walls of said channel.

15. An inlet manifold for a multi-cylinder internal combustion engine comprising a distributing section, conduits having different effective surge lengths extending from the periphery of said distributing section to the cylinders of the engine, means for introducing a properly proportioned fuel-air mixture into said distributing section toward the central portion thereof, a directing member within said distributing section spaced apart from the peripheral wall thereof and so constructed and positioned in correlation to the positions of entrance and to the angles of entrance to said conduits as to cause the liquid fuel particles projected by the back surges in the longer conduits into the distributing section to be thrown toward the entrance to a shorter conduit in substantially as large proportion as toward the entrance to another longer conduit.

16. An inlet manifold for a multi-cylinder internal combustion engine comprising a distributing section, two substantially alined long conduits leading to remote cylinders of the engine and a short conduit leading to an intermediate cylinder, means for introducing a properly proportioned fuel-air mixture into said distributing section toward the central portion thereof, a directing member within said distributing section spaced apart from the peripheral wall thereof and positioned eccentrically in said distributing section in such manner that the opening between the wall of said directing member and the wall of the distributing section establishing communication directly between the long conduit and a short conduit is of greater cross sectional area than the opening between the wall of said directing member and the wall of the distributing section establishing direct communication between the longer conduits.

17. A manifold for a multi-cylinder internal combustion engine comprising a distributing section, conduits extending from the periphery of said distributing section to the cylinders of the engine, means for introducing a properly proportioned fuel-air mixture into said distributing section comprising a delivery tube extending downwardly into said distributing section and terminating below the level of the upper inside wall of said conduits, said distributing section having a space surrounding the discharge end of the delivery tube and the lower end of said delivery tube having recesses complementary to the respective conduit entrances acting during an induction stroke of the engine, when the quantity of the mixture entering a conduit is increasing, to cause concentration of liquid fuel particles in the central portion of the conduit.

18. A manifold for a multi-cylinder internal combustion engine comprising a distributing section, conduits extending from the periphery of said distributing section to the cylinders of the engine, means for introducing a properly proportioned fuel-air mixture into said distributing section comprising a delivery tube extending downwardly into said distributing section and having such contour at its discharge end as will release portions of its contents at different levels within said distributing section to insure the carrying forward of liquid fuel particles within the mixture directly into the body portion of the fuel-air stream as it enters a conduit during an induction stroke of the engine when the quantity of mixture entering said conduit is increasing.

19. A manifold for a multi-cylinder internal combustion engine comprising a distributing section, conduits extending from the periphery of said distributing section to the cylinders of the engine, means for introducing a properly proportioned fuel-air mixture into said distributing section comprising a delivery tube extending downwardly and discharging the fuel-air mixture into the central portion of the distributing section, said distributing section having a space surrounding the discharge end of the delivery tube to prevent the flow of liquid particles directly from the delivery tube downwardly along the peripheral wall of the distributing section, said conduits having their positions of entrance and their angles of entrance to said distributing section so correlated relatively to each other and to the contour of said distributing section as to cause a back surge from any of the conduits to throw liquid particles entrained in the air stream in substantially equal proportions toward the entrance to other conduits.

20. A manifold for a multi-cylinder internal combustion engine comprising a distributing section, conduits extending from the periphery of said distributing section to the cylinders of the engine, means for introducing a properly proportioned fuel-air mixture including a delivery tube extending downwardly and discharging the fuel-air mixture into the central portion of said distributing section, said distributing section increasing gradually in cross sectional area upwardly from the level of the floor entrance to said conduits to provide ample entrance area to said conduits with a small floor area in said distributing section, thereby to insure sweeping of liquid from the floor by the velocity of the air passing over the floor during each induction stroke of the engine.

21. A manifold for a multi-cylinder internal combustion engine comprising a chamber having an upper energy-dissipating section and a lower distributing section, conduits extending from the periphery of said distributing section to the cylinders of the engine, means for directing downwardly fuel-air mixture from said energy-dissipating section into said distributing section terminating in a thin peripheral wall spaced apart from the wall of said distributing section, acting while the quantity of the mixture entering one of said conduits is increasing to prevent the flow of liquid particles directly from said thin wall to the peripheral wall of said distributing section.

22. A manifold for a multi-cylinder internal combustion engine comprising a chamber having an upper energy-dissipating section and a lower distributing section, conduits extending from the periphery of said distributing section to the cylinders of the engine, means for directing downwardly fuel-air mixture from said energy-dissipating section into said distributing section terminating in a thin peripheral wall spaced apart from the wall of said distributing section, and recesses in the end of said peripheral wall complementary to the respective conduit entrances acting, during an induction stroke of the engine when the quantity of the mixture entering the conduit is increasing, to concentrate liquid fuel particles in the central portion of the conduit.

23. A manifold for a multi-cylinder internal combustion engine comprising a chamber having an upper energy-dissipating section and a lower distributing section, conduits extending from the periphery of said distributing section to the cylinders of the engine, said distributing section increasing gradually in cross sectional area upwardly from the level of the floor entrance to said conduits, means for directing downwardly fuel-air mixture from said energy-dissipating section into said distributing section comprising a restricting wall terminating in a thin peripheral edge spaced apart from the peripheral wall of said distributing section, acting while the quantity of the mixture entering one of said conduits is increasing to prevent the flow of liquid particles directly from said edge to the peripheral wall of said distributing section.

24. A manifold for a multi-cylinder internal combustion engine comprising a chamber having an upper energy-dissipating section and a lower distributing section, increasing gradually in cross sectional area upwardly from the lower portion thereof, conduits extending from the periphery of said distributing section to the cylinders of the engine, means for directing downwardly fuel-air mixture from said energy-dissipating section into said distributing section comprising a restricting wall terminating in a thin peripheral edge spaced apart from the peripheral wall of said distributing section, said peripheral wall having recesses complementary to the respective conduit entrances acting during an induction stroke of the engine, when the quantity of the mixture entering the conduit is increasing, to concentrate liquid fuel particles in the central portion of the conduit.

25. A manifold for a multi-cylinder internal combustion engine comprising a chamber having an upper energy-dissipating section and a lower distributing section, conduits extending from the periphery of said distributing section to the cylinders of the engine, a carbureter for supplying a properly proportioned fuel-air mixture, a delivery tube in the form of an elbow extending from said carbureter through said energy-dissipating section into said distributing section and having such contour at its discharge end as will release portions of its contents at different levels within said distributing section to insure the carrying forward of liquid fuel particles within the mixture directly into the body portion of the fuel-air stream as it enters a conduit during an induction stroke of the engine when the quantity of mixture entering said conduit is increasing.

26. A manifold for a multi-cylinder internal combustion engine comprising a distributing section, conduits extending from the periphery of said distributing section to the cylinders of the engine, means for supplying a properly proportioned fuel-air mixture into said distributing section toward the central portion thereof in such manner as to prevent unequal concentration of liquid fuel particles within the mixture in any localized portion of said distributing section contiguous to the entrance to one of the conduits, said distributing section increasing gradually in cross sectional area upwardly from the level of the floor of said conduits to provide ample entrance area to said conduits with a small floor area of said distributing section, whereby lateral movement of the fuel-air mixture during each induction stroke will sweep liquid fuel particles from the floor of the distributing section during each induction stroke of the engine.

27. A manifold for a multi-cylinder internal combustion engine comprising a distributing section, conduits more than two in number leading from the periphery of said distributing section to the cylinders of the engine, said distributing section increasing gradually in cross sectional area upwardly from the level of the floor entrance to said conduits, means for supplying a properly proportioned fuel-air mixture to said distributing section including directing means acting on the fuel-air mixture within said distributing section to concentrate liquid fuel particles within the mixture in the middle portion of the entrance to a conduit during that portion of an induction stroke of the engine when the quantity of mixture entering said conduit is increasing.

MERL R. WOLFARD.